Patented Sept. 25, 1945

2,385,741

UNITED STATES PATENT OFFICE 2,385,741

NITRILATION OF HYDROCARBONS

John W. Teter, Chicago, Ill., assignor to Sinclair Refining Company, New York, N. Y., a corporation of Maine No Drawing. Application November 15, 1940, Serial No. 365,785

10 Claims. (Cl. 260—464)

This invention relates to the production of organic nitrogen compounds by the treatment of unsaturated hydrocarbons with hydrocyanic acid. More particularly, it relates to a catalytic process whereby hydrocyanic acid is caused to combine with unsaturated hydrocarbons of the olefinic type to form nitriles.

Nitriles have extensive and a wide variety of uses in the industries. Further, by the use of nitriles as intermediate materials many other important organic chemicals such as alcohols, acids, ketones and dicarboxylic acids used in the the manufacture of nylon may be synthesized.

It is an object of the present invention to decrease the cost of the production of nitriles by using as the primary raw material in their production hydrocarbons which are relatively abundant and inexpensive.

In the refining of hydrocarbon oil, for instance in the production of gasoline by cracking, large volumes of mixed gases are produced which contain considerable proportions of olefins. I have found olefins of the type so produced to be particularly advantageous charging material for the production of nitriles in accordance with my invention.

Olefins such as those present in the tail gases from petroleum cracking process are characterized by the presence of a double bond at the end of the carbon chain. I have found these olefins to be most active and most readily nitrilated under my reaction conditions. However, the unsaturated hydrocarbons which may be transformed into nitriles in accordance with my invention may be obtained from any available source; for instance, they may be obtained by the dehydration of substantially pure aliphatic organic compounds, such, for example, as paraffinic hydrocarbons and aliphatic alcohols. Also, polymer gasoline may be used.

Heretofore, it has been considered impossible to add hydrocyanic acid directly to an olefinic bond of a hydrocarbon. I have discovered that, if these olefinic hydrocarbons are treated with anhydrous hydrocyanic acid in the presence of a suitable catalyst, the hydrocyanic acid will combine with the unsaturated hydrocarbon to form nitriles. I am unable to state the precise manner in which this reaction occurs but generally it may be represented by the formula:

Under certain operating conditions amines have also been found in the resulting product. They are probably formed by a cracking or partial decomposition of the nitriles.

The reaction resulting in the nitrilation of the unsaturated hydrocarbons may be effected by bringing a mixture of anhydrous hydrocyanic acid and olefinic hydrocarbons into intimate contact with the catalyst over a considerable range of temperature and pressure conditions. However, the reaction resulting in the production of the nitriles is accompanied by several competing reactions. Specifically, there is a tendency for the hydrocarbons to crack or decompose into lighter, lower boiling hydrocarbons; likewise there is a tendency of the hydrocarbon to polymerize, to become hydrogenated or dehydrogenated; and also there is a tendency of the hydrocyanic acid and the nitriles to decompose. I have discovered that the rate and extent of these competing reactions vary with the processing conditions such as temperature and pressure and also with the particular catalyst used. To obtain yields of commercial significance it is essential to employ a selective catalyst and operating conditions which effectively promote the nitrilation reaction relative to these competing reactions.

I have found certain metallic catalysts to be useful for this purpose. Cobalt and copper catalysts appear to be the most effective. Of the two, cobalt appears to be superior to copper. The metal which is used as the catalyst preferably is highly dispersed so as to present a relatively large contact surface, and preferably is one which is reducible from its compounds and is rendered active by hydrogenation, so that a compound of the metal may be deposited on asbestos fibers, reduced to the metallic state and the resulting highly dispersed metal then activated by hydrogen.

For example, the cobalt catalyst may be prepared by suspending washed asbestos fibers in an aqueous solution of cobalt acetate to which aqueous sodium hydroxide is added slowly during agitation, following which the mass is filtered, washed with distilled water and then gradually increased in temperature to 650° F. The cobalt is then reduced to an active catalytic metal by exposure to a slow stream of hydrogen for about 100 hours at 550° F. The final catalyst mass so prepared contains about 27% of cobalt by weight.

I have further found that the nitrilation reaction is aided and the tendency of the hydrocyanic acid to decompose is decreased by maintaining the process under a considerable pressure of nitrogen gases. Decided advantages have been obtained by charging nitrogen to the process in sufficient quantities to maintain, under the reaction temperature, pressures of from approximately 1000 pounds per square inch to upwards of 2000 pounds per square inch. The temperatures used are from 400° to 750° F. or higher.

The following specific operations directed to the nitrilation of dodecene will illustrate the process of my invention, although it must be understood that my process is not limited to these specific operations.

Dodecene-1, the olefin used in the following specific operations, was prepared by dehydration of N-lauryl alcohol (the lauryl alcohol being obtained in the form currently marketed by E. I. du Pont de Nemours & Co., Inc., under the trade name "Palmal No. 23") over granular alumina. The olefin was separated from the unconverted alcohol by fractionation. The dodecene-1 thus obtained had a boiling range of 421–425° F., a specific gravity of 0.7634, a refractory index of 1.4330, a bromine addition number of 85.5 and a bromine substitution number of 2.5.

Because of the toxic nature of hydrocyanic acid these operations were carried out in a closed chamber. This chamber was equipped with a glass lining and had a capacity of 1.8 liters. It was adapted to be hermetically sealed and so designed that its contents could be heated to the desired temperature while being agitated and to withstand the pressure of upwards of 2000 pounds per square inch.

In each of the following operations approximately 100 grams of the catalyst and the indicated predetermined amounts of olefin and anhydrous liquid hydrocyanic acid were placed in the chamber. Nitrogen gas was then forced into the chamber in an amount calculated to be sufficient to give a predetermined pressure at the specific reaction temperature to be employed. The chamber was then sealed and heated with constant agitation. The duration of each of these tests was ten hours during which time the specified temperatures were maintained and agitation continued.

At the completion of each run the chamber and its contents were cooled to room temperature and the gas pressure therein released through a solution of caustic soda to absorb any remaining hydrocyanic acid. A caustic soda solution was then charged into the bomb and thoroughly mixed with the contents thereof for several minutes in order to neutralize any remaining acid. The contents of the chamber were then removed and the organic reaction products dried and distilled.

The results obtained in five illustrated runs under different operating conditions of temperature, pressure and concentrations and the like, together with the operating conditions of the respective runs, appear in the following tabulation:

Table I

|  | Run No. | | | | |
| --- | --- | --- | --- | --- | --- |
|  | 1 | 2 | 3 | 4 | 5 |
| Temperature °F | 400 | 550 | 650 | 650 | 700–750 |
| Pressure lbs. per sq. in. | 1,210 | 2,040 | 2,100 | 2,100 | 1,750 |
| Catalyst | (1) | (1) | (1) | (1) | (1) |
| Mol. ratio HCN to olefins | 1 | 1.36 | 1.6 | 1.6 | 1.6 |
| Olefins consumed weight per cent | 24 | 34.8 | 71.7 | 81.2 | 99.47 |
| Organic nitrogen compounds formed weight per cent | 0.208 | 1.41 | 3.45 | 2.18 | 3.49 |

1 Cobalt.
2 Copper.

The percentages of organic nitrogen compounds formed appearing in the above tabulation are based on the amount of olefin charged to the operation. The catalyst used was in the form heretofore described, i. e. metal catalyst deposited on asbestos fibers.

The olefins not consumed in the operation are recovered and may be used as charge material for a second treatment.

The olefin consumed in the respective operations is accounted for in the following tabulation, the figures representing percentages by weight based on total amount of olefin consumed:

Table II

|  | Run No. | | | | |
| --- | --- | --- | --- | --- | --- |
|  | 1 | 2 | 3 | 4 | 5 |
| In the production of: | | | | | |
| Organic nitrogen compound | .191 | .94 | 3.03 | 1.88 | 3.54 |
| Cracked products | 13.37 | 3.76 | 5.61 | 10.1 | 18.6 |
| Hydrogenated products | 0.8 | None | 10.5 | 1.9 | 7.97 |
| Polymerized products | 3.4 | 9.38 | 49.3 | 44.3 | 42.65 |
| Loss | 6.24 | 20.72 | 2.26 | 3.02 | 28.2 |

Analysis of the liquid products of the respective runs was made by first separating the product by fractional distillation into three fractions designated herein "low boiling fraction," "intermediate fraction" and "high boiling fraction." The low boiling fraction was that portion of the product boiling below 400° F. The intermediate fraction was taken between 400 and 410° F. and the high boiling fraction was the remainder of the product boiling above 410° F.

The proportions of the three fractions of the respective runs and the percentages of organic nitrogen compound present in each fraction, both being based upon the amount of olefin charge, appear in the following tabulation:

Table III

|  | Run No. | | | | |
| --- | --- | --- | --- | --- | --- |
|  | 1 | 2 | 3 | 4 | 5 |
| Low boiling fraction | 13.4 | 3.8 | 5.7 | 10.1 | 19.8 |
| Organic nitrogen compound | .028 | .042 | .094 | None | 1.14 |
| Intermediate fraction | 76.8 | 64.0 | 38.8 | 40.7 | 8.5 |
| Organic nitrogen compound | None | 0.35 | 0.64 | None | None |
| High boiling fraction | 3.58 | 10.4 | 52.0 | 46.5 | 45 |
| Organic nitrogen compound | .18 | 1.02 | 2.72 | 2.18 | 2.35 |

The percentage of organic nitrogen compounds, if any, present in the low boiling fraction, is usually relatively small except at the more severe temperature conditions. That present in the low boiling fraction of the products of the above runs appeared to consist largely of amines and in Table III was calculated as primary octyl amine. As previously stated, it is believed that these anilines are produced by the incidental cracking of previously formed nitriles. However, my invention is not dependent upon the accuracy of such assumption.

The organic nitrogen compounds present in the intermediate and high boiling fractions generally consist of a mixture of various nitriles. In the composite product of the foregoing runs the nitriles were found largely in the fraction distilling off between temperatures of 295° F. to 450° F. at 100 millimeters absolute pressure and the fraction distilling at temperatures above 490° F. at 1 millimeter absolute pressure.

The nitriles boiling between 295 and 450° F. at 100 millimeters pressure appear to consist primarily of aliphatic nitriles having approximately 13 carbon atoms per molecule. Those boiling within the higher temperature range appear to be largely aromatic or cyclic in character. However, in calculating the percentages of organic nitrogen compound appearing for the intermediate and high boiling fractions of Table III, all were assumed to tridecyl nitrile.

I claim:

1. In the production of nitriles, the improvement which comprises reacting at an elevated temperature and pressure an olefine with anhydrous hydrocyanic acid in the presence of a catalyst in the form of a dispersed metal which is reducible from its compounds by means of hydrogen, which has been rendered active by hydrogenation and selectively promotes the nitrilation reaction.

2. In the production of nitriles, the improvement which comprises reacting an olefine with anhydrous hydrocyanic acid in the presence of a metallic catalyst from the group consisting of copper and cobalt.

3. In the production of nitriles, the improvement which comprises reacting an olefine with anhydrous hydrocyanic acid in the presence of copper.

4. In the production of nitriles, the improvement which comprises reacting an olefine with anhydrous hydrocyanic acid in the presence of cobalt.

5. In the production of nitriles, the improvement which comprises reacting, at an elevated temperature, and in the presence of sufficient nitrogen to create an elevated pressure, an olefine with anhydrous hydrocyanic acid in the presence of a catalyst in the form of a dispersed metal which is reducible from its compounds by means of hydrogen, which has been rendered active by hydrogenation and selectively promotes the nitrilation reaction.

6. In the production of nitriles, the improvement which comprises reacting, at a temperature of from about 400° F. to 750° F. and under a pressure of from about 1,000 to 2,000 lbs. per square inch, an olefine with anhydrous hydrocyanic acid in the presence of a catalyst selected from the group consisting of copper and cobalt.

7. In the production of nitriles the process comprising reacting dodecene with anhydrous liquid hydrocyanic acid in the presence of nitrogen gas and of a cobalt catalyst at temperatures of 400-750° F. and pressures of from about 1000 to upwards of 2000 pounds per square inch.

8. In the production of nitriles the process comprising reacting dodecene with anhydrous liquid hydrocyanic acid in the presence of nitrogen gas and of a cobalt catalyst at a temperature of approximately 650° F. and pressure of approximately 2100 pounds per square inch, the molecular ratio of hydrocyanic acid to dodecene being 1.6.

9. In the production of nitriles the process comprising reacting dodecene with anhydrous liquid hydrocyanic acid in the presence of nitrogen gas and of a copper catalyst at a temperature of approximately 650° F. and a pressure of approximately 2100 pounds per square inch, the molecular ratio of hydrocyanic acid to dodecene being 1.6.

10. In the production of nitriles, the process comprising reacting dodecene with anhydrous liquid hydrocyanic acid in the present of nitrogen gas and a catalyst of the class consisting of cobalt and copper at temperatures of 400-750° F. and pressures of from about 1000 and upwards of 2000 pounds per square inch.

JOHN W. TETER.

---

CERTIFICATE OF CORRECTION.

Patent No. 2,385,741. September 25, 1945.

JOHN W. TETER.

It is hereby certified that error appears in the printed specification of the above numbered patent requiring correction as follows: Page 1, first column, line 28, for the word "process" read --processes--; page 3, first column, line 2, after "to" insert --be--; and second column, line 31, claim 10, for "present" read --presence--; and that the said Letters Patent should be read with this correction therein that the same may conform to the record of the case in the Patent Office.

Signed and sealed this 18th day of December, A. D. 1945.

Leslie Frazer (Seal) First Assistant Commissioner of Patents.

mediate and high boiling fractions of Table III, all were assumed to tridecyl nitrile.

I claim:

1. In the production of nitriles, the improvement which comprises reacting at an elevated temperature and pressure an olefine with anhydrous hydrocyanic acid in the presence of a catalyst in the form of a dispersed metal which is reducible from its compounds by means of hydrogen, which has been rendered active by hydrogenation and selectively promotes the nitrilation reaction.

2. In the production of nitriles, the improvement which comprises reacting an olefine with anhydrous hydrocyanic acid in the presence of a metallic catalyst from the group consisting of copper and cobalt.

3. In the production of nitriles, the improvement which comprises reacting an olefine with anhydrous hydrocyanic acid in the presence of copper.

4. In the production of nitriles, the improvement which comprises reacting an olefine with anhydrous hydrocyanic acid in the presence of cobalt.

5. In the production of nitriles, the improvement which comprises reacting, at an elevated temperature, and in the presence of sufficient nitrogen to create an elevated pressure, an olefine with anhydrous hydrocyanic acid in the presence of a catalyst in the form of a dispersed metal which is reducible from its compounds by means of hydrogen, which has been rendered active by hydrogenation and selectively promotes the nitrilation reaction.

6. In the production of nitriles, the improvement which comprises reacting, at a temperature of from about 400° F. to 750° F. and under a pressure of from about 1,000 to 2,000 lbs. per square inch, an olefine with anhydrous hydrocyanic acid in the presence of a catalyst selected from the group consisting of copper and cobalt.

7. In the production of nitriles the process comprising reacting dodecene with anhydrous liquid hydrocyanic acid in the presence of nitrogen gas and of a cobalt catalyst at temperatures of 400–750° F. and pressures of from about 1000 to upwards of 2000 pounds per square inch.

8. In the production of nitriles the process comprising reacting dodecene with anhydrous liquid hydrocyanic acid in the presence of nitrogen gas and of a cobalt catalyst at a temperature of approximately 650° F. and pressure of approximately 2100 pounds per square inch, the molecular ratio of hydrocyanic acid to dodecene being 1.6.

9. In the production of nitriles the process comprising reacting dodecene with anhydrous liquid hydrocyanic acid in the presence of nitrogen gas and of a copper catalyst at a temperature of approximately 650° F. and a pressure of approximately 2100 pounds per square inch, the molecular ratio of hydrocyanic acid to dodecene being 1.6.

10. In the production of nitriles, the process comprising reacting dodecene with anhydrous liquid hydrocyanic acid in the present of nitrogen gas and a catalyst of the class consisting of cobalt and copper at temperatures of 400–750° F. and pressures of from about 1000 and upwards of 2000 pounds per square inch.

JOHN W. TETER.

---

CERTIFICATE OF CORRECTION.

Patent No. 2,385,741. September 25, 1945.

JOHN W. TETER.

It is hereby certified that error appears in the printed specification of the above numbered patent requiring correction as follows: Page 1, first column, line 28, for the word "process" read --processes--; page 3, first column, line 2, after "to" insert --be--; and second column, line 31, claim 10, for "present" read --presence--; and that the said Letters Patent should be read with this correction therein that the same may conform to the record of the case in the Patent Office.

Signed and sealed this 18th day of December, A. D. 1945.

Leslie Frazer (Seal) First Assistant Commissioner of Patents.